April 14, 1959
J. C. BACKE
2,881,548
SONIC ACTION FISH LURE
Filed April 30, 1956
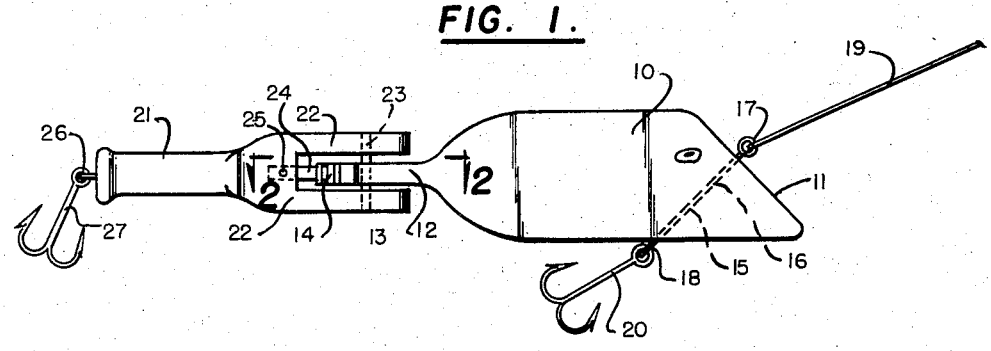
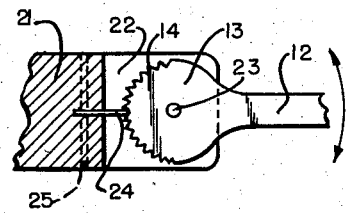
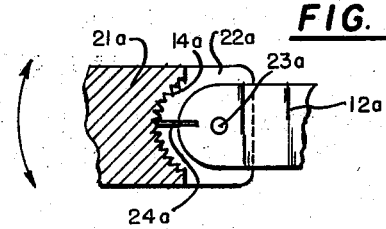
INVENTOR.
JOHN C. BACKE
By Kimmel & Crowell
attorneys

2,881,548
SONIC ACTION FISH LURE
John C. Backe, Gaylord, Mich.
Application April 30, 1956, Serial No. 581,534
6 Claims. (Cl. 43—42.31)

This invention relates to fish lures.

It is an object of the present invention to provide a sonic action fish lure wherein, as the lure is pulled through the water and due to the current, there is a wiggling or wobbling action between the head and tail members, which relative movement simultaneously causes sounds to be emitted so as to attract the fish more readily.

It is another object of the present invention to provide a sonic action fish lure of the above type wherein the sounds are synchronized with the movements or the wobbling action of the head and tail members.

Other objects of the invention are to provide a sonic action fish lure bearing the above objects in mind which is of simple construction, has a minimum number of parts, is inexpensive to manufacture and effective in use.

For other objects and for a better understanding of the invention, reference may be had to the following detailed description taken in connection with the accompanying drawing, in which:

Figure 1 is a side elevational view of a preferred embodiment of the present invention;

Fig. 2 is a horizontal fragmentary sectional view taken along the line 2—2 of Fig. 1; and Fig. 3 is a view similar to Fig. 2 of a modified form of the present invention.

Referring now more in detail to the drawing, 10 indicates a head member having an inclined front surface 11 and integrally formed at its other end with the reduced shank 12, substantially as illustrated. The shank 12 is integrally formed with the circular enlargement 13 provided around one-half its periphery with the teeth 14.

The head 10 is provided with an inclined bore 15 extending through the inclined surface 11 and through the bottom of the head and within which is positioned a link 16, terminating in the eyes 17 and 18. The fish line 19 is connected to the eye 17 while a fish hook 20 is connected to the eye 18.

A separable tail member is provided and includes the shank 21 integrally formed with the bifurcated portions 22 adapted to receive therebetween the enlargement 13, the latter being pivotally mounted therebetween by means of the pin 23, as will be obvious. Thus, the head and tail may rotate relative to each other about the vertical axis of the pin 23. A leaf spring 24 has one end embedded in the tail member intermediate the bifurcated portions 22, being secured thereat by means of the pin 25, the leaf spring 24 being in mesh with the teeth 14 whereby to snap into the adjacent teeth upon relative displacement of the head and tail members. This will produce a sound which is audible to the fish and which will attract the same more readily, simultating the sounds of insects and other organic creatures. These sounds will also be synchronized with the movement between the parts of the tail and head members, to simulate sounds on the part of the lure itself.

An eye 26 is mounted in the end of shank 21 remote from the bifurcated portion and mounts thereat the second fish hook 27.

Referring now particularly to Fig. 3, there is shown a modified form of the present invention wherein the position of the sound creating members are reversed. The tail member 21a having the bifurcated portions 22a is now formed with the semicircular arranged teeth 14a which cooperate with the leaf spring 24a fixedly carried by the shank 12a of the head member, the shank 12a being rotatively mounted intermediate the bifurcated portions 22a by means of the pin 23a.

In other respects the form of the invention shown in Fig. 3 is the same as that shown in Figs. 1 and 2.

While various changes may be made in the detail construction, it shall be understood that such changes shall be within the spirit and scope of the present invention as defined by the appended claims.

What I claim as new and desire to protect by Letters Patent of the United States is:

1. A sonic action fish lure comprising a head member, a separable tail member, means connecting said head and tail members to permit relative movement therebetween, fish hook means connected to said head and tail members, means for connecting the fishing line to said head member and cooperating sound producing means carried by the adjacent ends of said head and tail members engaging to produce sounds upon rotational movement therebetween.

2. A sonic action fish lure according to claim 1, said means connecting said head and tail members comprising a shank connected to the rear end of said head member, and a bifurcated portion connected to the forward end of said tail member said shank being received intermediate said bifurcated portion, and pin means pivotally mounting the rear end of said shank within said bifurcated portion.

3. A sonic action fish lure according to claim 2, said sound producing means comprising a circular enlargement at the rear end of said shank rotatably mounted intermediate said bifurcated portion, said circular enlargement having toothed edges around one-half its circumference, and a flat spring member fixedly carried by said tail member intermediate said bifurcated portion in mesh with said toothed edge whereby to snap into the various toothed openings upon relative movement between said head and tail member.

4. A sonic action fish lure according to claim 2, said sound producing means comprising a circularly arranged toothed portion provided in said tail member intermediate said bifurcated portion at the inner end thereof and a flat spring member fixedly carried by the end of said shank in mesh with said toothed portion whereby to emit sounds as it is snapped into the adjacent toothed portions upon relative movement between said head and tail members.

5. A fish lure comprising a head portion, a tail portion, means hingedly securing said tail portion to said head portion in aligned relation thereto, fish hooks secured to said head portion and to said tail portion, a toothed segment carried by one of said portions and a fixed flexible member carried by the other of said portions in contact with said toothed segment whereby sonic vibrations will be produced upon movement of said head section relative to said tail section.

6. A fish lure comprising a head portion, a tail portion, means hingedly securing said tail portion to said head portion in aligned relation thereto, said portions being hinged about an axis transverse to the axis of the lure, a fish hook secured to said lure, a toothed segment carried by one of said portions, and a fixed flexible member carried by the other of said portions in contact with said toothed segment whereby sonic vibrations will be produced upon relative movement of said head and tail sections.

References Cited in the file of this patent
UNITED STATES PATENTS

| 898,813 | Woolnough | Sept. 15, 1908 |
| 2,552,730 | Miller | May 15, 1951 |
| 2,606,389 | Fortmann | Aug. 12, 1952 |
| 2,674,060 | Simmons | Apr. 6, 1954 |